(12) United States Patent
Liu et al.

(10) Patent No.: US 11,015,717 B2
(45) Date of Patent: May 25, 2021

(54) AUTOMATIC BACK-PRESSURE VALVE FOR USE IN SUPERCRITICAL FLUID CHROMATOGRAPHIC SYSTEM

(71) Applicant: JIANGSU HANBON SCIENCE & TECHNOLOGY CO., LTD, Huaian (CN)

(72) Inventors: Jie Liu, Huaian (CN); Yan Zhang, Huaian (CN); Zhong Yan, Huaian (CN); Zhiling Li, Huaian (CN)

(73) Assignee: JIANGSU HANBON SCIENCE & TECHNOLOGY CO., LTD., Huaian (CN)

(*) Notice: Subject to any disclaimer, the term of this patent is extended or adjusted under 35 U.S.C. 154(b) by 51 days.

(21) Appl. No.: 16/469,107

(22) PCT Filed: Sep. 5, 2017

(86) PCT No.: PCT/CN2017/100498
§ 371 (c)(1),
(2) Date: Jun. 12, 2019

(87) PCT Pub. No.: WO2018/176736
PCT Pub. Date: Oct. 4, 2018

(65) Prior Publication Data
US 2020/0018402 A1    Jan. 16, 2020

(30) Foreign Application Priority Data

Mar. 31, 2017  (CN) .......................... 201710207040.7

(51) Int. Cl.
*F16K 1/38*    (2006.01)
*F16K 17/04*   (2006.01)
*F16K 15/08*   (2006.01)
*F16K 31/122*  (2006.01)

(52) U.S. Cl.
CPC ................ *F16K 1/38* (2013.01); *F16K 15/08* (2013.01); *F16K 17/04* (2013.01); *F16K 31/122* (2013.01)

(58) Field of Classification Search
CPC .......... F16K 1/38; F16K 17/04; F16K 31/122; F16K 17/06; F16K 17/065; F16K 17/044; F16K 17/10; F16K 31/1221; F16K 31/1223; F16K 31/1225
See application file for complete search history.

(56) References Cited

U.S. PATENT DOCUMENTS

| 3,100,001 A * | 8/1963 | Forwald | F16K 31/122 137/596.1 |
| 5,913,504 A * | 6/1999 | Nishimura | F16B 21/186 251/62 |
| 5,927,329 A * | 7/1999 | Yie | A62C 31/02 137/624.13 |

(Continued)

*Primary Examiner* — Kelsey E Cary
(74) *Attorney, Agent, or Firm* — CBM Patent Consulting, LLC

(57) ABSTRACT

An automatic back-pressure valve comprises a spring support (1), an ejector rod spring (2), an ejector rod (3), a piston rod (4), a guide band (5), a cylinder body (6), an O-ring seal ring A (7), an O-ring seal ring B (8), a piston rod spring (9), a cylinder cover (10), a guide sleeve (11), a conical ceramic element (12), a seal ring (13), a sealing base (14), a valve body (15), a screw (16) and a positioning sleeve (17).

3 Claims, 1 Drawing Sheet

(56) References Cited

U.S. PATENT DOCUMENTS

| | | | | |
|---|---|---|---|---|
| 7,225,830 B1* | 6/2007 | Kershaw | ................. | F16K 17/06 |
| | | | | 137/512.1 |
| 2003/0178067 A1* | 9/2003 | Fredrickson | .......... | F16K 17/065 |
| | | | | 137/529 |
| 2005/0056318 A1* | 3/2005 | Arlinghaus, Jr. | .... | G05D 16/185 |
| | | | | 137/505.13 |
| 2011/0114203 A1* | 5/2011 | Mazzoni | ................. | F16K 17/06 |
| | | | | 137/514 |
| 2016/0018007 A1* | 1/2016 | Eckholz | ................. | F16K 47/04 |
| | | | | 251/318 |
| 2016/0131264 A1* | 5/2016 | Bregazzi | ................... | F16K 1/38 |
| | | | | 251/333 |

\* cited by examiner

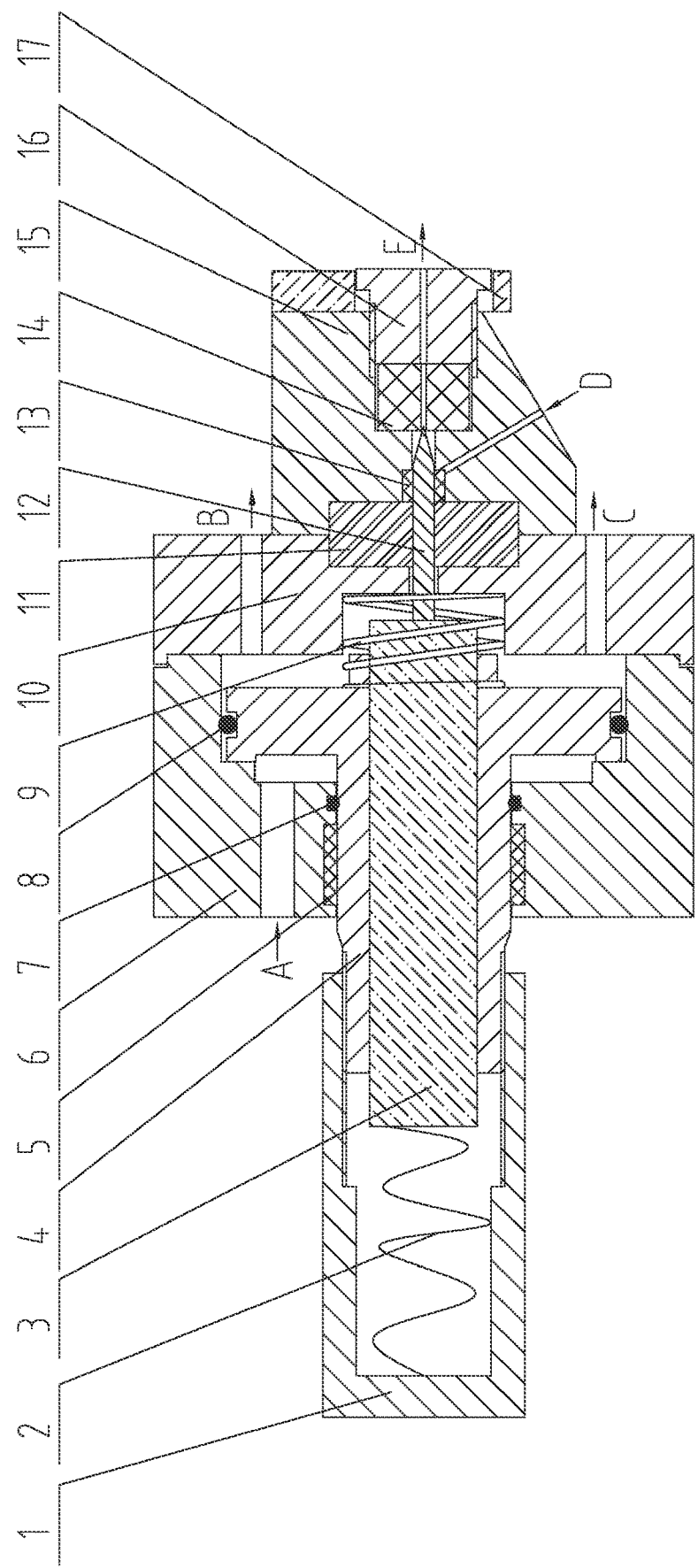

AUTOMATIC BACK-PRESSURE VALVE FOR USE IN SUPERCRITICAL FLUID CHROMATOGRAPHIC SYSTEM

TECHNICAL FIELD

The present invention relates to an automatic back-pressure valve for use in a supercritical fluid chromatographic system, belonging to the field of chromatography.

BACKGROUND ART

The primary problem to be solved in a supercritical fluid chromatographic instrument is how to realize supercritical $CO_2$, because the critical point temperature of $CO_2$ is 30.98° C. and the pressure of $CO_2$ is 7.377 MPa. The objective is generally realized by raising the temperature to increase the pressure of supercritical $CO_2$ after pump. It needs to add a back-pressure valve in a flow path of supercritical $CO_2$ after pump, and adjusts the opening of the back-pressure valve to control the pressure. In order to ensure stable operation of the supercritical fluid chromatographic instrument, the requirement for pressure control precision of the back-pressure valve is higher. At present, the supercritical fluid chromatographic instrument generally adopts a manual back-pressure valve, and the manual back-pressure valve generally consists of adjusting and overflowing parts. The manual back-pressure valve realizes pressure control by adjusting the elasticity of a built-in spring; when the system pressure is less than the setting pressure, the spring presses a diaphragm to block the outlet of the back-pressure valve; and when the system pressure is greater than the setting pressure, the fluid pushes the diaphragm to compress the spring so as to open the outlet of the back-pressure valve. According to such structure, when the system pressure is greater than the setting pressure, the fluid quickly passes through the back-pressure valve, the system pressure decreases below the setting pressure within a short time, the diaphragm blocks the outlet of the back-pressure valve, and in this case, the system needs to raise the pressure to the setting pressure again to enable the back-pressure valve to be opened, so that the fluctuation of the system pressure is caused, and the pressure fluctuation influences the performance of the supercritical fluid chromatographic instrument.

SUMMARY OF THE INVENTION

The present invention is directed to an automatic back-pressure valve for use in a supercritical fluid chromatographic system to solve a problem in which existing manual back-pressure valves are unable to meet requirements of a supercritical fluid chromatographic instrument with respect to pressure stability and pressure control precision.

The technical solution of the present invention is as follows:

An automatic back-pressure valve for use in a supercritical fluid chromatographic system consists of a spring support 1, an ejector rod spring 2, an ejector rod 3, a piston rod 4, a guide band 5, a cylinder body 6, an O-ring seal ring A7, an O-ring seal ring B8, a piston rod spring 9, a cylinder cover 10, a guide sleeve 11, a conical ceramic element 12, a seal ring 13, a sealing base 14, a valve body 15, a screw 16, and a positioning sleeve 17, wherein the spring support 1 is connected to the piston rod 4 through threads; the cylinder cover 10 is connected to the cylinder body 6 through a bolt; the valve body 15 is connected to the cylinder cover 10 through a bolt; the screw 16 is connected to the valve body 15 through threads; and the positioning sleeve 17 is connected to the valve body 15 through a bolt. The materials of the spring support 1, the piston rod 4, the cylinder body 6, the cylinder cover 10, the valve body 15 and the screw 16 adopt 316L stainless steel, the guide sleeve 11 and the sealing base 14 are made from PEEK, and the seal ring 13 is made from a perfluoro material. Therefore, the present invention can meet the use of most liquids (including various chemical organic solvents) and gases.

The automatic back-pressure valve for use in the supercritical fluid chromatographic system has two adjusting parts: (1) the pressure of the compressed air of an inlet A is adjusted to compress the piston rod 4, the piston rod 4 drives the spring support 1 to compress the ejector rod spring 2, the ejector rod spring 2 presses the ejector rod 3, the ejector rod 3 pushes the conical ceramic element 12 for sealing, where a back-pressure valve opening pressure value (system pressure value) can be set by adjusting the pressure of the compressed air of the inlet A; and (2) the length of threaded connection between the spring support 1 and the piston rod 4 is adjusted to change the amount of compression of the ejector rod spring 2, when the system pressure is greater than the set pressure, the conical ceramic element 12 is withdrawn from the sealing base 14, and the conical ceramic element 12 pushes the ejector rod 3 to compress the ejector rod spring 2 to adjust the amount of compression of the ejector rod spring 2 so as to ensure the speed and distance of the conical ceramic element 12 withdrawn from the sealing base 14, thereby greatly reducing the fluctuation frequency and range of the system pressure.

Compared with the existing manual back-pressure valves, the automatic back-pressure valve provided by the present invention has the following advantages: (1) compared with a back-pressure valve which can change the system pressure only by adjusting the elasticity of a spring, the automatic back-pressure valve provided by the present invention has double adjustment functions and can change the system pressure by adjusting the elasticity of the spring or adjusting the pressure of the compressed air; (2) changing the setting pressure of the system by adjusting the pressure of the compressed air is more stable than changing the set pressure of the system by adjusting the elasticity of the spring, and automatic control can be realized; (3) the automatic back-pressure valve provided by the present invention is additionally provided with an adjusting device capable of quickly stabilizing the system pressure; and (4) the automatic back-pressure valve provided by the present invention can also be used as a check valve or a relief valve and is high in pressure resistance and wide in application range.

BRIEF DESCRIPTION OF THE DRAWINGS

FIG. 1 is a structural diagram of the present invention:
1. Spring support
2. Ejector rod spring
3. Ejector rod
4. Piston rod
5. Guide band
6. Cylinder body
7. O-ring seal ring A
8. O-ring seal ring B
9. Piston rod spring
10. Cylinder cover
11. Guide sleeve
12. Conical ceramic element
13. seal ring
14. Sealing base 15. Valve body
16. Screw
17. Positioning sleeve

DETAILED DESCRIPTION OF THE INVENTION

The present invention is further described in detail in conjunction with the drawing.

An automatic back-pressure valve for use in a supercritical fluid chromatographic system consists of a spring support 1, an ejector rod spring 2, an ejector rod 3, a piston rod 4, a guide band 5, a cylinder body 6, an O-ring seal ring A7, an O-ring seal ring B8, a piston rod spring 9, a cylinder cover 10, a guide sleeve 11, a conical ceramic element 12, a seal ring 13, a sealing base 14, a valve body 15, a screw 16, and a positioning sleeve 17. The spring support 1 is connected to the piston rod 4 through threads; the cylinder cover 10 is connected to the cylinder body 6 through a bolt; the valve body 15 is connected to the cylinder cover 10 through a bolt; the screw 16 is connected to the valve body 15 through threads; and the positioning sleeve 17 is connected to the valve body 15 through a bolt.

Inlets and outlets: A is a compressed air inlet, B and C are air outlets of the cylinder body, D is a fluid inlet, and E is a fluid outlet.

Firstly, the pressure value of the compressed air of the inlet A is set, and a gap between the piston rod 4 and the left side of the cylinder body 6 is a compressed air energy storage space capable of effectively stabilizing the instantaneous action force of the compressed air on the piston rod 4. The piston rod 4 drives the spring support 1 to compress the ejector rod spring 2, the ejector rod spring 2 presses the ejector rod 3, the ejector rod 3 pushes the sharp part of the conical ceramic element 12 to enter an inner hole of the sealing base 14, and in this case, the automatic back-pressure valve provided by the present invention is in a closed state. When a fluid continuously enters the gap between the seal ring 13 and the sealing base 14 from the inlet D, the pressure rises; after the pressure exceeds the pressure of the ejector rod 3 acting on the conical ceramic element 12, the conical ceramic element 12 is withdrawn from the sealing base 14; in this case, the automatic back-pressure valve provided by the present invention is in an open state, and the fluid flows out from the outlet E; and the speed and distance of the conical ceramic element 12 withdrawn from the sealing base 14 can be effectively ensured by adjusting the ejector rod spring 2, thereby enabling the system pressure to quickly reach a stable state.

Stable state of system pressure: when the pressure of the compressed air acting on the piston rod 4 is equal to the pressure of the fluid between the seal ring 13 and the sealing base 14, the system pressure is in a stable state, and the automatic back-pressure valve provided by the present invention is in an open state.

The above embodiments are merely illustrative of the technical idea of the present invention, and the protection scope of the present invention is limited thereto. Any changes made based on the technical solution according to the technical idea of the present invention fall within the protection scope of the present invention.

What is claimed is:

1. An automatic back-pressure valve in a supercritical fluid chromatographic system, comprising a spring support (1), an ejector rod spring (2), an ejector rod (3), a piston rod (4), a guide band (5), a cylinder body (6), an O-ring seal ring A (7), an O-ring seal ring B (8), a piston rod spring (9), a cylinder cover (10), a guide sleeve (11), a conical ceramic element (12), a seal ring (13), a sealing base (14), a valve body (15), a screw (16), and a positioning sleeve (17), wherein the spring support (1) is connected to the piston rod (4) through threads; the cylinder cover (10) is connected to the cylinder body (6) through a first bolt; the valve body (15) is connected to the cylinder cover (10) through a second bolt; the screw (16) is connected to the valve body (15) through threads; and the positioning sleeve (17) is connected to the valve body (15) through a third bolt; wherein a gap between the piston rod (4) and left side of the cylinder body (6) is a compressed air energy storage space capable of effectively stabilizing an action force of compressed air on the piston rod (4), the piston rod (4) drives the spring support (1) to compress the ejector rod spring (2) that presses the ejector rod 3, then, the ejector rod (3) pushes sharp part of the conical ceramic element (12) to enter an inner hole of the sealing base (14); the conical ceramic element (12) is withdrawn from the sealing base (14) when a fluid continuously enters a gap between the seal ring (13) and the sealing base (14).

2. The automatic back-pressure valve in the supercritical fluid chromatographic system according to claim 1, wherein the spring support (1), the piston rod (4), the cylinder body (6), the cylinder cover (10), the valve body (15) and the screw (16) adopt 316L stainless steel, the guide sleeve (11) and the sealing base (14) are made from Polyether ether ketone (PEEK), and the seal ring (13) is made from a perfluoro material.

3. The automatic back-pressure valve in the supercritical fluid chromatographic system according to claim 1, wherein length of threaded connection between the spring support (1) and the piston rod (4) is adjusted to change amount of compression of the ejector rod spring (2); when the conical ceramic element (12) is withdrawn from the sealing base (14), the conical ceramic element (12) pushes the ejector rod (3) to compress the ejector rod spring (2) to adjust the amount of compression of the ejector rod spring (2).

* * * * *